(12) United States Patent
Kimura et al.

(10) Patent No.: US 10,815,555 B2
(45) Date of Patent: Oct. 27, 2020

(54) HEAT-RESISTANT, AUSTENITIC CAST STEEL HAVING EXCELLENT THERMAL FATIGUE PROPERTIES, AND EXHAUST MEMBER MADE THEREOF

(71) Applicant: HITACHI METALS, LTD., Tokyo (JP)

(72) Inventors: Hirofumi Kimura, Moka (JP); Tomonori Namito, Moka (JP); Susumu Katsuragi, Moka (JP); Junji Hayakawa, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 273 days.

(21) Appl. No.: 15/515,651

(22) PCT Filed: Oct. 5, 2015

(86) PCT No.: PCT/JP2015/078228
§ 371 (c)(1),
(2) Date: Mar. 30, 2017

(87) PCT Pub. No.: WO2016/052750
PCT Pub. Date: Apr. 7, 2016

(65) Prior Publication Data
US 2017/0298489 A1 Oct. 19, 2017

(30) Foreign Application Priority Data
Oct. 3, 2014 (JP) ................. 2014-204840

(51) Int. Cl.
| | | |
|---|---|---|
| *C22C 38/60* | (2006.01) | |
| *C22C 38/48* | (2006.01) | |
| *C22C 38/50* | (2006.01) | |
| *C22C 38/00* | (2006.01) | |
| *C22C 38/02* | (2006.01) | |
| *C22C 38/04* | (2006.01) | |

(52) U.S. Cl.
CPC .............. *C22C 38/60* (2013.01); *C22C 38/00* (2013.01); *C22C 38/001* (2013.01); *C22C 38/002* (2013.01); *C22C 38/02* (2013.01); *C22C 38/04* (2013.01); *C22C 38/48* (2013.01); *C22C 38/50* (2013.01)

(58) Field of Classification Search
CPC ....... C22C 38/001; C22C 38/02; C22C 38/04; C22C 38/48; C22C 38/60; C22C 38/00; C22C 38/34; C22C 38/58; C22C 38/26; C22C 38/40; C22C 38/18; C22C 37/08; C21D 2211/001; C21D 2211/004

USPC ........ 420/42, 69, 70, 38, 68, 34, 51, 54, 55, 420/584.1, 65
See application file for complete search history.

(56) References Cited

U.S. PATENT DOCUMENTS

| | | | |
|---|---|---|---|
| 6,033,626 A | 3/2000 | Takahashi | |
| 9,765,678 B2 * | 9/2017 | Morishita | ............... C22C 38/00 |
| 2007/0034302 A1 | 2/2007 | Takahashi et al. | |
| 2007/0217941 A1 | 9/2007 | Hayashi et al. | |
| 2013/0022488 A1 | 1/2013 | Genma et al. | |
| 2015/0086412 A1 * | 3/2015 | Morishita | ............... C22C 38/00 |
| | | | 420/42 |

FOREIGN PATENT DOCUMENTS

| | | |
|---|---|---|
| EP | 1679387 A1 | 7/2006 |
| EP | 2848710 A1 | 3/2015 |
| JP | 57-029562 A | 2/1982 |
| JP | 11236653 A | 8/1999 |
| JP | 2000-096192 A | 4/2000 |
| JP | 2001262287 A * | 9/2001 |
| JP | 2011-219801 A | 11/2011 |
| JP | 2014-210293 A | 11/2014 |
| WO | 2005/103314 A1 | 11/2005 |
| WO | 2013168770 A1 | 11/2013 |

OTHER PUBLICATIONS

JPH-11236653-A machine translation, 1999, 6 pages. (Year: 1999).*
JP-2001262287-A machine translation, 2001, 5 pages. (Year: 2001).*
Communication dated Feb. 23, 2018, from State Intellectual Property Office of the P.R.C in counterpart application No. 201580052132.1.
International Search Report of PCT/JP2015/078228 dated Dec. 28, 2015 [PCT/ISA/210].
Communication dated Mar. 8, 2018, from European Patent Office in counterpart application No. 15846497.4.

* cited by examiner

*Primary Examiner* — Matthew E. Hoban
*Assistant Examiner* — Lynne Edmondson
(74) *Attorney, Agent, or Firm* — Sughrue Mion, PLLC

(57) ABSTRACT

A heat-resistant, austenitic cast steel having excellent thermal fatigue properties, comprising by mass 0.3-0.6% of C, 0.5-3% of Si, 0.5-2% of Mn, 15-30% of Cr, 6-30% of Ni, 0.6-5% of Nb, 0.01-0.5% of N, and 0.01-0.5% of S, C/N being 4-7, and the balance being Fe and inevitable impurities; and a ratio A/B of a Cr-carbide-forming index A to a Nb-carbide-forming index B being 0.6-1.7, wherein A and B are expressed by the formula (1) of A=8.5C−Nb+0.05Cr+ 0.65Ni−5, and the formula (2) of B=7.8Nb.

13 Claims, 1 Drawing Sheet

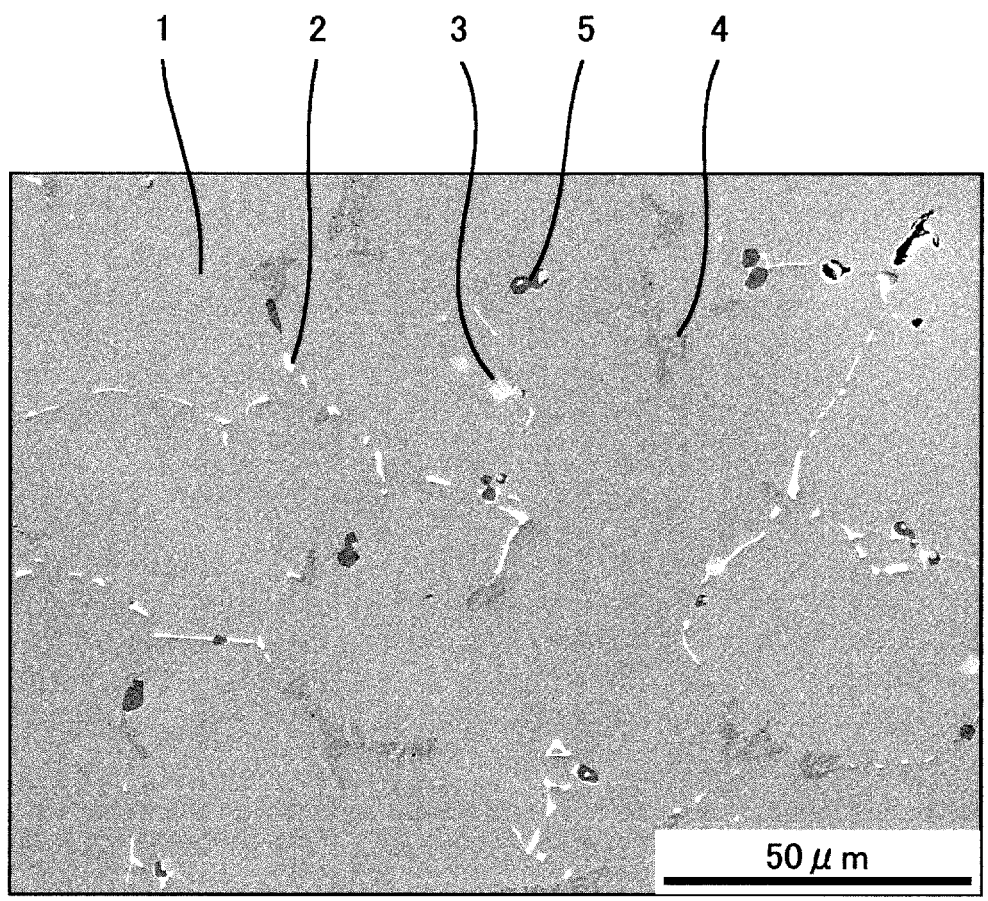

HEAT-RESISTANT, AUSTENITIC CAST STEEL HAVING EXCELLENT THERMAL FATIGUE PROPERTIES, AND EXHAUST MEMBER MADE THEREOF

CROSS REFERENCE TO RELATED APPLICATIONS

This application is a National Stage of International Application No. PCT/JP2015/078228, filed Oct. 5, 2015 (claiming priority based on Japanese Patent Application No. 2014-204840, filed Oct. 3, 2014), the contents of which are incorporated herein by reference in their entirety.

FIELD OF THE INVENTION

The present invention relates to a heat-resistant, austenitic cast steel having excellent thermal fatigue properties suitable for exhaust members, particularly turbine housings, etc. of automobiles, and an exhaust member made thereof.

BACKGROUND OF THE INVENTION

For the purpose of environmental load reduction and environmental protection recently needed on a global scale, the cleaning of exhaust gases for reducing the emission of air-polluting materials, and the improvement of fuel efficiency (low fuel consumption) for suppressing the emission of $CO_2$, a cause of global warming, are strongly required in automobiles. For this purpose, various technologies such as the development of engines with higher performance and fuel efficiency, the cleaning of exhaust gases, the weight reduction of car bodies, the air resistance reduction of car bodies, efficient power transmission from engines to driven systems with low loss, etc. have been developed and employed.

Technologies for providing engines with high performance and improved fuel efficiency include the direct injection of fuel, the high pressure of fuel injection, increase in compression ratios, decrease in displacements by turbochargers, the reduction of engine weights and sizes (downsizing), etc., and are used not only in luxury cars but also in popular cars. As a result, fuel combustion tends to occur at higher temperatures and pressure, resulting in higher-temperature exhaust gases discharged from combustion chambers of engines to exhaust members. For example, the temperatures of exhaust gases are 1000° C. or higher even in popular cars, like luxury sport cars, so that the surface temperatures of exhaust members tend to exceed 900° C. Because exhaust members exposed to high-temperature oxidizing gases are subjected to repeated heating/cooling cycles by the start and stop of engines in a severer oxidizing environment than ever, they are required to have higher heat resistance and durability than ever.

Exhaust members such as turbine housings, exhaust manifolds, etc. used for automobiles have conventionally been formed by castings with high freedom of shape, because of their complicated shapes. In addition, because of their severe, high-temperature use conditions, heat-resistant cast irons such as high-Si, spheroidal graphite cast irons and Ni-resist cast irons (Ni—Cr-containing, austenitic cast irons), heat-resistant, ferritic cast steels, heat-resistant, austenitic cast steels, etc. are used. Particularly when exhaust members have surface temperatures of 900° C. or higher, their materials are heat-resistant, ferritic cast steels or heat-resistant, austenitic cast steels.

However, because the heat-resistant, ferritic cast steels usually have poor high-temperature strength at 900° C. or higher, they are not suitably used in a temperature range exceeding 950° C. Materials capable of withstanding higher temperatures than heat-resistant, ferritic cast steels are heat-resistant, austenitic cast steels. For example, WO 2005/103314 proposes a high-Cr, high-Ni, heat-resistant, austenitic cast steel comprising by mass 0.2-1.0% of C, 3% or less of Si, 2% or less of Mn, 15-30% of Cr, 6-30% of Ni, 0.5-6% (as W+2Mo) of W and/or Mo, 0.5-5% of Nb, 0.23% or less of Al, 0.01-0.5% of N, 0.5% or less of S, and 0.07% or less of O, the balance being substantially Fe and inevitable impurities. Because this heat-resistant, austenitic cast steel has high high-temperature yield strength, oxidation resistance and room-temperature elongation, as well as excellent thermal fatigue properties particularly when exposed to a high-temperature exhaust gas at 1000° C. or higher, it is suitable for exhaust members, etc. for automobile engines.

Exhaust members are required to be adapted for temperature elevation and oxidation by gases discharged from engines, and for severe use conditions. For example, in an exhaust-gas-cleaning treatment (treatment for removing harmful substance, etc. from an exhaust gas by a catalyst or a filter in an exhaust-gas-cleaning apparatus), cleaning performance should be increased by rapidly heating the catalyst for activation after the engine starts, or by supplying an exhaust gas to the catalyst or filter uniformly. For the rapid activation of a catalyst, an exhaust gas flowing through the exhaust member should suffer less temperature decrease, namely, the heat of an exhaust gas should be dissipated as little as possible. Accordingly, the exhaust member is required to be thin to have small heat mass (heat capacity) in its exhaust gas flow path. However, a thinner exhaust member suffers more temperature elevation by an exhaust gas.

A recent trend of reducing engine displacement by turbochargers, and the size and weight of engines makes the use environment of exhaust members severer. Smaller engines are accompanied by smaller exhaust members. Because the exhaust members are made thinner for the above exhaust-gas-cleaning treatment, and because smaller exhaust members have smaller heat mass as a whole, the exhaust members tend to suffer larger temperature elevation.

Increase in the amount of an intake gas by supercharging by turbochargers, etc. results in increase in the amount of an exhaust gas, which increases heat flow added to the exhaust member. As a result, the temperature elevation (temperature-elevating speed) of the exhaust member per a unit time increases. Because the exhaust member has thin portions and thick portions, as well as a complicated shape including portions in contact with the exhaust gas and those not in contact with the exhaust gas, temperature difference is generated in the exhaust member, through which an exhaust gas passes. In general, a metal member subjected to temperature difference, namely thermal stress by a temperature gradient, cracks tends to be cracked. Heat flow increased by supercharging leads to a higher temperature-elevating speed of an exhaust member, so that a temperature gradient increases in the exhaust member. A larger temperature gradient leads to higher thermal stress, so that the exhaust member tends to be cracked or broken. Increase in the temperature gradient of an exhaust member becomes larger as the supercharging pressure or supercharging efficiency becomes higher.

Thus, automobile exhaust members should be adapted to temperature elevation and oxidation by exhaust gases, temperature elevation due to thinning and heat mass decrease, a larger temperature gradient by the increased heat flow, etc. Specifically, when exhaust members are exposed to exhaust gases at as high temperatures as 950-1100° C., the temperatures of exhaust members per se are elevated to 900-1050° C., near 1000° C. The exhaust members should have excellent heat resistance and durability at such high temperatures. To meet this requirement, materials forming the exhaust members are required to have excellent thermal fatigue properties, oxidation resistance, high-temperature strength, ductility (elongation), etc. Though the heat-resistant, austenitic cast steel of WO 2005/103314 is contemplated to be used for exhaust members exposed to exhaust gases at 1000° C. or higher, it is still insufficient for use in exhaust members exposed to the above severe conditions, and its thermal fatigue properties particularly need improvement.

OBJECT OF THE INVENTION

Accordingly, an object of the present invention is to provide a heat-resistant, austenitic cast steel having excellent thermal fatigue properties near 1000° C., and an exhaust member such as a turbine housing, etc. made of this heat-resistant, austenitic cast steel.

SUMMARY OF THE INVENTION

As a result of intensive research on a composition range of heat-resistant, austenitic cast steel, whose heat resistance, particularly thermal fatigue properties, can be improved, the inventors have found that limiting the amounts of main alloy elements such as C, Cr, Ni, Nb, etc. to proper ranges provides the heat-resistant, austenitic cast steel with drastically improved thermal fatigue properties. The present invention has been completed.

Thus, the heat-resistant, austenitic cast steel of the present invention having excellent thermal fatigue properties comprises by mass
0.3-0.6% of C,
0.5-3% of Si,
0.5-2% of Mn,
15-30% of Cr,
6-30% of Ni,
0.6-5% of Nb,
0.01-0.5% of N, and
0.01-0.5% of S,
an amount ratio C/N of C to N being 4-7,
the balance being Fe and inevitable impurities; and
a ratio A/B of a Cr-carbide-forming index A to a Nb-carbide-forming index B
expressed by the following formulae (1) and (2):

$$A = 8.5C - Nb + 0.05Cr + 0.65Ni - 5 \quad (1), \text{ and}$$

$$B = 7.8Nb \quad (2),$$

wherein the symbol of an element in each formula represents its content (% by mass), being 0.6-1.7.

The heat-resistant, austenitic cast steel of the present invention preferably further contains 0.005-0.5% by mass of Zr. In the structure of the heat-resistant, austenitic cast steel containing Zr, the number of Zr nitride particles having equivalent circle diameters of 1.5 μm or more is preferably 20-150 per a field area of 0.25 mm².

The heat-resistant, austenitic cast steel of the present invention preferably has a fatigue life of 1500 cycles or more, when measured by a high-temperature, low-cycle fatigue test, which loads tensile strain and compression strain under the conditions of a test temperature of 900° C., a strain amplitude of 0.5%, a strain rate of 0.1%/second, and a compression-keeping time of 1 minute.

The exhaust member of the present invention is made of the above heat-resistant, austenitic cast steel having excellent thermal fatigue properties. Examples of this exhaust member include a turbine housing, an exhaust manifold, a turbine-housing-integrated exhaust manifold, a catalyst case, a catalyst-case-integrated exhaust manifold, and an exhaust outlet.

EFFECTS OF THE INVENTION

Because the heat-resistant, austenitic cast steel of the present invention has excellent heat resistance and durability, as well as high thermal fatigue properties near 1000° C., exhaust members such as turbine housings, etc. made thereof can be used under severe conditions at as high temperatures as near 1000° C.

BRIEF DESCRIPTION OF THE DRAWINGS

FIG. 1 is an electron photomicrograph of the test piece of Example 35.

DESCRIPTION OF THE PREFERRED EMBODIMENTS

[1] Heat-Resistant, Austenitic Cast Steel

The heat-resistant, austenitic cast steel of the present invention will be explained in detail below. The amounts of elements constituting the heat-resistant cast steel are expressed by "% by mass," unless otherwise mentioned.

(A) Composition (1) C (Carbon): 0.3-0.6%

C improves the fluidity of a melt, castability, partially provides solid solution strengthening to a matrix, and forms carbides to improve high-temperature strength. To exhibit such functions effectively, the C content should be 0.3% or more. However, more than 0.6% of C generates excessive carbides, providing the heat-resistant cast steel with low thermal fatigue properties, machinability and ductility. Accordingly, the C content is 0.3-0.6%. The lower limit of the C content is preferably 0.35%, more preferably 0.4%. The upper limit of the C content is preferably 0.55%, more preferably 0.5%.

(2) Si (Silicon): 0.5-3%

Si is an element acting as a deoxidizer of a melt, and effectively improving oxidation resistance and thus thermal fatigue properties. To obtain such functions, the Si content should be 0.5% or more. However, excessive Si makes the austenite structure unstable, providing the heat-resistant cast steel with deteriorated castability, and further poor machinability due to hardening. Thus, the Si content should be 3% or less. Accordingly, the Si content is 0.5-3%. The lower limit of the Si content is preferably 0.8%, more preferably 1%. The upper limit of the Si content is preferably 2%, more preferably 1.6%.

(3) S (Sulfur): 0.01-0.5%

S is combined with Mn and Cr to form sulfides such as MnS, (Mn/Cr)S, etc., whose lubricating function improves the machinability of the heat-resistant cast steel. To obtain this effect, S should be 0.01% or more. However, more than 0.5% of S tends to deteriorate the high-temperature strength and ductility of the heat-resistant cast steel, and providing the heat-resistant cast steel with poor thermal fatigue properties due to excessively formed sulfides. Accordingly, the S content is 0.01-0.5%. The lower limit of the S content is preferably 0.05%, more preferably 0.1%. The upper limit of the S content is preferably 0.3%, more preferably 0.2%.

(4) Mn (Manganese): 0.5-2%

Mn is effective as a deoxidizer of a melt like Si, and combined with S to form sulfides such as MnS, etc., thereby improving the machinability of the heat-resistant cast steel. To exhibit these effects, the Mn content should be 0.5% or more. However, because excessive Mn deteriorates the oxidation resistance of the heat-resistant cast steel, the Mn content should be 2% or less. Thus, the Mn content is 0.5-2%. The lower limit of the Mn content is preferably 0.7%, and the upper limit of the Mn content is preferably 1.3%.

(5) Cr (Chromium): 15-30%

Cr is an element effective for austenitizing the structure of the heat-resistant cast steel together with Ni described below, thereby increasing the heat resistance (high-temperature strength and oxidation resistance) of the heat-resistant cast steel. To exhibit the effect of improving heat resistance particularly at high temperatures near 1000° C., Cr should be 15% or more. However, Cr is an element crystallizing Cr carbide based on $Cr_{23}C_6$ and $Cr_7C_3$. Because Cr carbide does not fit in an austenite matrix crystallographically, there are weak eutectic boundaries between Cr carbide and austenite, acting as the propagation paths of cracks. When the Cr content is more than 30%, a lot of Cr carbide is crystallized, tending to accelerate the propagation of cracks, thereby providing the heat-resistant cast steel with extremely low thermal fatigue properties and ductility. On the other hand, when excessive Cr is contained, ferrite is crystallized in the structure, resulting in low high-temperature strength. Thus, the Cr content is 15-30%. The lower limit of the Cr content is preferably 20%, more preferably 24%. The upper limit of the Cr content is preferably 28%, more preferably 26%.

(6) Ni (Nickel): 6-30%

Ni is an austenite-forming element, which stabilizes the austenite structure of the heat-resistant cast steel, increases the high-temperature strength and oxidation resistance of the heat-resistant cast steel together with Cr, and improves the castability of thin exhaust members having complicated shapes. To exhibit such functions, the Ni content should be 6% or more. However, when more than 30% of Ni is contained, an increased amount of Ni dissolved in the matrix lowers the solid solution limit of C in the matrix, resulting in excessive crystallization of Cr carbide, thereby providing the heat-resistant cast steel with low thermal fatigue properties. In addition, even when more than 30% of Ni is contained, the effects of improving the above properties are saturated, leaving only economic disadvantages because of the expensiveness of the element. Accordingly, the Ni content is 6-30%. The lower limit of the Ni content is preferably 10%, more preferably 11%. The upper limit of the Ni content is preferably 25%, more preferably 22%.

(7) Nb (Niobium): 0.6-5%

Nb is combined with C more predominantly than Cr, to form fine Nb carbide, thereby suppressing the crystallization of Cr carbide, and indirectly improving the high-temperature strength and thermal fatigue properties of the heat-resistant cast steel. Further, Nb forms eutectic carbide with austenite, improving castability, which is important in the production of thin, complicated-shaped castings such as exhaust members. To such end, Nb should be 0.6% or more. On the other hand, when Nb exceeds 5%, a lot of hard eutectic carbide is formed in crystal grain boundaries, rather providing the heat-resistant cast steel with low high-temperature strength and thermal fatigue properties, and extremely reduced ductility because of brittleness. In addition, because excessive Nb forms fine Nb carbide particles and colonies of densely gathered eutectic carbide with austenite, making the heat-resistant cast steel less resistant to oxidation. Accordingly, the Nb content is 0.6-5%. The lower limit of the Nb content is preferably 0.8%. The upper limit of the Nb content is preferably 3%, more preferably 2.2%.

(8) N (Nitrogen): 0.01-0.5%

N is a strong austenite-forming element, stabilizing the austenite matrix of the heat-resistant cast steel to improve high-temperature strength. N is also an element effective for making finer crystal grains in complicated-shaped castings, to which forging or rolling for making crystal grains finer cannot be conducted. With N contained, crystal grains become finer, thereby improving the ductility and machinability of the heat-resistant cast steel. Also, because N makes the diffusion speed of C lower, the aggregation of precipitated carbides is retarded, thereby effectively suppressing carbide particles from becoming larger, and thus preventing embrittlement. To obtain such effects, the N content should be 0.01% or more. However, more than 0.5% of N lowers the solid solution limit of C in the matrix like Ni, resulting in excessive crystallization of Cr carbide, and thus providing the heat-resistant cast steel with low thermal fatigue properties. Also, when N is contained in as much an amount as more than 0.5%, N is dissolved in the matrix in an large amount, making the heat-resistant cast steel hard, and combined with Cr and Al to precipitate large amounts of hard, brittle nitrides such as $Cr_2N$, AlN, etc., thereby providing the heat-resistant cast steel with poor high-temperature strength and ductility. Further, excessive N accelerates the generation of gas defects such as pinholes, blowholes, etc. during casting, thereby deteriorating a casting yield. Accordingly, the N content is 0.01-0.5%. The lower limit of the N content is preferably 0.05%, more preferably 0.06%. The upper limit of the N content is preferably 0.4%, more preferably 0.2%.

(9) C/N: 4-7

The optimization of a ratio C/N is a measure of controlling the crystallization of carbonitrides. Both of C and N, interstitial elements, are dissolved in the matrix, providing a stable austenite matrix for improved high-temperature strength. In addition, because C and N are fixed by dissolved in the matrix to form a solid solution, the amounts of carbonitrides crystallized in grain boundaries in a final solidification stage decrease, suppressing decrease in thermal fatigue properties. Particularly in the heat-resistant cast steel of the present invention having a large Cr content, planar or network-shaped Cr carbides based on $Cr_{23}C_6$ and $Cr_7C_3$ are crystallized in grain boundaries, resulting in extremely deteriorated thermal fatigue properties. Accordingly, C is desirably dissolved as a solid solution in the matrix as much as possible. In order that C is dissolved as a solid solution in the matrix, it may be contemplated to reduce the N content as much as possible, but N should exist in a proper amount in the heat-resistant cast steel of the present invention to improve ductility and machinability by making austenite crystal grains finer, and to effectively prevent embrittlement by suppressing the precipitated carbide from becoming larger. With C and N contained in proper amounts, the optimization of C/N is effective to accelerate the formation of a solid solution of C in the matrix. With C/N optimized, the solid solution limit of C can be elevated while keeping the addition effects of N.

When the amount of C is small relative to that of N (small C/N), a large amount of N is dissolved as a solid solution in the matrix, lowering the solid solution limit of C. As a result, a large amount of Cr carbide is crystallized, resulting in low thermal fatigue properties. To obtain good thermal fatigue properties, C/N should be 4 or more. On the other hand, when the amount of C is large relative to that of N (large C/N), a large amount of C is dissolved as a solid solution in the matrix, lowering the solid solution limit of N. Because N has higher effect of stabilizing an austenite matrix than that of C, the suppression of forming a solid solution of N results in low high-temperature strength. To obtain good high-temperature strength, C/N should be 7 or less. Thus, C/N is 4-7. C/N is preferably 5-6.

(10) A/B: 0.6-1.7

In the present invention, in addition to meeting the above composition range of each element, a ratio A/B of a Cr-carbide-forming index A to a Nb-carbide-forming index B expressed by the following formulae (1) and (2):

$$A=8.5C-Nb+0.05Cr+0.65Ni-5 \quad (1), \text{ and}$$

$$B=7.8Nb \quad (2),$$

wherein the symbol of an element in each formula represents its content (% by mass), is preferably 0.6-1.7.

In the formula (1), the Cr-carbide-forming index A indicating the tendency of crystallizing Cr carbide gets larger (more Cr carbide) as the amounts of C, Cr and Ni become larger, and smaller (less Cr carbide) as the amount of Nb becomes larger. In the formula (2), the Nb-carbide-forming index B indicating the tendency of crystallizing Nb carbide gets larger (more Nb carbide) proportionally as the Nb content becomes larger.

The amounts of Cr carbide and Nb carbide crystallized are changed by the amounts of C, Cr, Ni and Nb, and when their crystallization amounts are substantially the same, the thermal fatigue properties are at maximum. Accordingly, larger A/B leads to a small amount of C fixed by Nb, resulting in a larger amount of Cr carbide crystallized, and thus lower thermal fatigue properties and ductility. On the other hand, smaller A/B leads to a larger amount of Nb carbide crystallized, despite a smaller amount of Cr carbide crystallized, resulting in lower thermal fatigue properties, high-temperature strength and ductility. To obtain good thermal fatigue properties, A/B is preferably 0.6-1.7, more preferably 0.7-1.3, most preferably 0.8-1.2.

To achieve a desired range of A/B, the Nb content is preferably adjusted depending on the Ni content. For example, the Nb content is desirably 0.6-1% when the Ni content is about 10%, 0.75-1.2% when the Ni content is about 13%, and 1.3-2% when the Ni content is about 20%.

(11) Zr (Zirconium): 0.005-0.5%

The heat-resistant, austenitic cast steel of the present invention containing Zr has a structure in which Cr carbide particles, Nb carbide particles, sulfide particles such as MnS, and Zr nitride particles are dispersed in an austenite matrix composed of fine crystal grains. Particularly when Zr nitride particles having equivalent circle diameters of 1.5 µm or more are contained in the number of 20-150 per a field area of 0.25 mm$^2$, the heat-resistant cast steel has a strengthened matrix, thereby having improved thermal fatigue properties.

Because oxides, nitrides and carbides such as ZrO$_2$, ZrN, ZrC, etc. formed by Zr contained are dispersed in the matrix of the heat-resistant cast steel, to act as nuclei of forming Nb carbide and sulfides such as MnS, Nb carbide and sulfides such as MnS are finely dispersed. It is presumed that the fine dispersion of Cr carbide crystallized in a final solidification stage is not caused by nuclei of forming ZrO$_2$, ZrN, ZrC, etc., but indirectly caused by finely dispersed Nb carbide crystallized in an early stage of solidification and fine austenite crystal grains.

When Zr is not contained, a large amount of eutectic carbide of Nb carbide and austenite is formed densely in a colony or lamellar shape. When Nb carbide having strong oxidizing tendency is crystallized densely, Nb carbide particles are too close to each other, likely becoming vulnerable to oxidation. As a result, the heat-resistant cast steel has low oxidation resistance, and thus low thermal fatigue properties. With Zr contained, granular Nb carbide particles are finely dispersed, resulting in larger distance between Nb carbide particles, and thus lower oxidizing tendency. As a result, the heat-resistant cast steel has improved thermal fatigue properties.

Further, Zr is combined with N to form not only ZrN functioning as nuclei for forming Nb carbide and sulfides such as MnS, etc., but also finely dispersed Zr nitride to strengthen the matrix. As a result, the heat-resistant cast steel is provided with improved thermal fatigue properties.

When Zr is contained to obtain the above effect, Zr is preferably 0.005% or more. On the other hand, when Zr is more than 0.5%, carbonitride such as ZrN, ZrC, etc. is excessively crystallized without obtaining correspondingly increased effects, providing the heat-resistant cast steel with brittleness and lower high-temperature strength, ductility and machinability, merely resulting in economic disadvantages because Zr is an expensive element.

Thus, when Zr is contained, its content is 0.005-0.5%. The lower limit of the Zr content is preferably 0.01%, more preferably 0.03%, most preferably 0.04%. The upper limit of the Zr content is preferably 0.3%, more preferably 0.2%, most preferably 0.1%.

(12) Inevitable Impurities

Inevitable impurities contained in the heat-resistant, austenitic cast steel of the present invention are mainly P, Al, W and Mo coming from the starting material and/or the deoxidizer. Because P is segregated in crystal grain boundaries, resulting in extremely low toughness, its amount is preferably as small as possible, desirably 0.06% or less. Al foul's inclusions such as slug of Al$_2$O$_3$, causing casting defects and thus deteriorating a casting yield. Al also forms hard and brittle AlN, lowering ductility and machinability. Accordingly, the amount of Al is preferably as small as possible, desirably 0.05% or less. W and Mo form carbides, lowering ductility. W and Mo are also dissolved in the matrix, reducing the amount of Cr dissolved in the matrix, and thus lowering the oxidation resistance of the matrix. Further, W and Mo accelerate the crystallization of Cr carbide, deteriorating the thermal fatigue properties. Accordingly, the amounts of W and Mo are preferably as small as possible, W and Mo being preferably 0.5% or less each, more preferably 0.5% or less in total.

(B) Structure

By containing Zr, the heat-resistant, austenitic cast steel of the present invention preferably has 20-150 Zr nitride particles having equivalent circle diameters 1.5 µm or more per a field area of 0.25 mm$^2$ in the structure. With 20 or more Zr nitride particles having equivalent circle diameters of 1.5 µm or more per a field area of 0.25 mm$^2$, the matrix is strengthened, providing the heat-resistant cast steel with improved thermal fatigue properties. Because Zr nitride particles having equivalent circle diameters of less than 1.5 µm do not have strong effects of improving thermal fatigue properties, the number of Zr nitride particles having equivalent circle diameters of 1.5 µm or more is counted in the present invention. Because Zr nitride particles are hard and brittle, more than 150 Zr nitride particles per a field area of 0.25 mm$^2$ provide the heat-resistant cast steel with low ductility and machinability. The number of Zr nitride particles having equivalent circle diameters of 1.5 µm or more is more preferably 30-100 per a field area of 0.25 mm². To provide the heat-resistant cast steel with improved ductility and machinability, Zr nitride particles are preferably as fine as possible. Specifically, the average equivalent circle diameter of Zr nitride particles is preferably 1.5-10 µm, more preferably 1.5-5 µm, most preferably 1.5-3 µm.

(C) Thermal Fatigue Properties

Exhaust members are required to have long thermal fatigue lives to the repetition of start (heating) and stop (cooling) of engines. The thermal fatigue life is one of indexes representing thermal fatigue properties. The larger number of cycles until thermal fatigue failure occurs by cracking and deformation caused by repeated heating and cooling in a thermal fatigue test means a longer thermal fatigue life, and thus better thermal fatigue properties. The thermal fatigue test for evaluating a thermal fatigue life includes (a) a thermal fatigue life test (TMF: theretomechanical fatigue), in which a constrained material is repeatedly given a temperature amplitude by heating and cooling to cause thermal fatigue failure, with elongation and shrinkage due to heating and cooling mechanically constrained; and (b) a high-temperature, low-cycle fatigue test (LCF: low-cycle fatigue), in which a material is subjected to tension and compression with a constant strain amplitude at a constant temperature, to cause thermal fatigue failure by repeated loading of strain.

TMF evaluating a thermal fatigue life by heating and cooling may be regarded as being close to an actual engine test. It is determined, for example, by repeating a heating/cooling cycle comprising a temperature-elevating time of 2 minutes, a temperature-keeping time of 1 minute and a cooling time of 4 minutes, 7 minutes in total, with the lowest cooling temperature of 150° C., the highest heating temperature of 1000° C., and a temperature amplitude of 850° C. Because this test needs a lot of time, and because necking occurs in the material due to expansion and shrinkage by heating and cooling during the test, the thermal fatigue life may not be evaluated precisely. On the other hand, LCF is determined by a test of repeating a tension/compression cycle comprising loading strain for 10 seconds, and keeping compression for 1 minute, 1 minute 10 seconds in total (70 seconds). Because LCF needs only a short test time, and because necking by expansion and shrinkage does not occur in the material due to a constant test temperature, LCF can evaluate the thermal fatigue life more precisely than TMF. Accordingly, both thermal fatigue tests of TMF and LCF were conducted, to evaluate the thermal fatigue properties of the heat-resistant cast steel by LCF, while using TMF for additional data.

The heat-resistant, austenitic cast steel of the present invention preferably has a fatigue life of 1500 cycles or more, when measured by a high-temperature, low-cycle fatigue test (LCF test) with strain loaded by tension and compression, under the conditions of a test temperature of 900° C., a strain amplitude of 0.5%, a strain rate of 0.1%/second, and a compression-keeping time of 1 minute. With the LCF thermal fatigue life of 1500 cycles or more, the heat-resistant, austenitic cast steel may be regarded as having excellent thermal fatigue properties, suitable for exhaust members whose temperatures are elevated to near 1000° C. by exposure to exhaust gases at 950-1100° C. The LCF thermal fatigue life is more preferably 1800 cycles or more, further preferably 1900 cycles or more, most preferably 2000 cycles or more, particularly 2200 cycles or more.

With A/B of 0.6-1.7 and the Zr content of 0.005-0.5%, the heat-resistant, austenitic cast steel of the present invention can have a LCF thermal fatigue life of 2000 cycles or more.

[2] Exhaust Member

The exhaust member of the present invention is made of the above heat-resistant, austenitic cast steel. Preferred examples of the exhaust members include a turbine housing, an exhaust manifold, a turbine-housing-integrated exhaust manifold obtained by integrally casting a turbine housing and an exhaust manifold, a catalyst case, a catalyst-case-integrated exhaust manifold obtained by integrally casting a catalyst case and an exhaust manifold, and an exhaust outlet, though not restrictive, of course.

The exhaust member of the present invention exhibits high heat resistance and durability, even when heated to 900-1050° C. by exposure to an exhaust gas at 950-1100° C. Because the exhaust member of the present invention is adapted to high-temperature, severe use conditions, it enables the application of the technologies of improving the performance and fuel efficiency of engines to popular cars. It is thus expected that the exhaust member of the present invention contributes to cleaning exhaust gases of automobiles and improving the fuel efficiency.

The present invention will be explained in more detail by Examples below without intention of restriction. Here, the amount of each element constituting the heat-resistant, austenitic cast steel is expressed by "% by mass," unless otherwise mentioned.

Examples 1-25, and Comparative Examples 1-33

The chemical compositions, C/N and A/B of the heat-resistant, austenitic cast steels of Examples 1-25 are shown in Tables 1-1 and 1-2, and the chemical compositions, C/N and A/B of the heat-resistant cast steels of Comparative Examples 1-33 are shown in Tables 2-1 and 2-2. Comparative Examples 1-33 are outside the scope of the present invention in at least one of the chemical composition, C/N and A/B. Comparative Example 33 is an example of high-Cr, high-Ni, heat-resistant, austenitic cast steels described in WO 2005/103314, which contains 2.8% by mass of W. Except for W in Comparative Example 33, inevitable impurities in each heat-resistant cast steel were 0.02% or less of P, 0.03% or less of Al, 0.1% or less of W, and 0.1% or less of Mo.

TABLE 1-1

| | Composition (% by mass) | | | | | |
|---|---|---|---|---|---|---|
| No. | C | Si | Mn | S | Cr | Ni |
| Example 1 | 0.30 | 1.45 | 0.97 | 0.140 | 15.4 | 7.9 |
| Example 2 | 0.43 | 1.51 | 1.01 | 0.150 | 15.0 | 15.0 |
| Example 3 | 0.35 | 1.43 | 0.98 | 0.130 | 18.2 | 10.0 |
| Example 4 | 0.44 | 1.40 | 0.96 | 0.140 | 20.0 | 8.0 |
| Example 5 | 0.45 | 1.46 | 0.98 | 0.150 | 20.0 | 10.0 |
| Example 6 | 0.31 | 1.01 | 1.85 | 0.135 | 25.0 | 13.1 |
| Example 7 | 0.32 | 1.32 | 0.95 | 0.138 | 24.9 | 14.7 |
| Example 8 | 0.45 | 1.38 | 0.97 | 0.142 | 24.8 | 12.6 |
| Example 9 | 0.46 | 1.46 | 0.99 | 0.144 | 24.9 | 12.9 |
| Example 10 | 0.46 | 1.46 | 0.99 | 0.144 | 24.9 | 12.9 |
| Example 11 | 0.45 | 1.41 | 0.96 | 0.128 | 25.1 | 12.9 |
| Example 12 | 0.44 | 1.51 | 0.94 | 0.147 | 24.9 | 13.0 |
| Example 13 | 0.44 | 1.40 | 0.96 | 0.142 | 24.5 | 12.7 |
| Example 14 | 0.45 | 1.48 | 0.98 | 0.150 | 24.9 | 19.9 |
| Example 15 | 0.42 | 1.40 | 0.98 | 0.150 | 24.9 | 20.1 |
| Example 16 | 0.48 | 1.52 | 0.99 | 0.149 | 25.1 | 20.2 |
| Example 17 | 0.46 | 1.46 | 0.93 | 0.148 | 25.0 | 20.0 |
| Example 18 | 0.45 | 1.52 | 0.99 | 0.146 | 25.0 | 19.8 |

TABLE 1-1-continued

| No. | C | Si | Mn | S | Cr | Ni |
|---|---|---|---|---|---|---|
| Example 19 | 0.46 | 1.44 | 0.94 | 0.140 | 24.5 | 20.7 |
| Example 20 | 0.47 | 1.39 | 0.98 | 0.145 | 24.8 | 20.0 |
| Example 21 | 0.43 | 1.49 | 0.92 | 0.141 | 25.0 | 20.0 |
| Example 22 | 0.46 | 1.41 | 0.95 | 0.135 | 24.5 | 20.2 |
| Example 23 | 0.44 | 1.41 | 1.53 | 0.460 | 24.3 | 20.1 |
| Example 24 | 0.52 | 1.50 | 1.02 | 0.151 | 25.1 | 23.5 |
| Example 25 | 0.58 | 1.55 | 1.06 | 0.274 | 29.8 | 29.5 |

TABLE 1-2

| No. | Nb | N | C/N | A/B | Fe |
|---|---|---|---|---|---|
| Example 1 | 0.60 | 0.041 | 7.3 | 0.6 | Bal. |
| Example 2 | 0.95 | 0.085 | 5.1 | 1.1 | Bal. |
| Example 3 | 0.65 | 0.047 | 7.4 | 0.9 | Bal. |
| Example 4 | 0.82 | 0.079 | 5.6 | 0.6 | Bal. |
| Example 5 | 0.98 | 0.080 | 5.6 | 0.7 | Bal. |
| Example 6 | 0.60 | 0.058 | 5.3 | 1.5 | Bal. |
| Example 7 | 0.61 | 0.081 | 4.0 | 1.7 | Bal. |
| Example 8 | 0.64 | 0.103 | 4.4 | 1.5 | Bal. |
| Example 9 | 0.75 | 0.085 | 5.4 | 1.3 | Bal. |
| Example 10 | 0.80 | 0.085 | 5.4 | 1.2 | Bal. |
| Example 11 | 1.04 | 0.086 | 5.2 | 0.9 | Bal. |
| Example 12 | 1.20 | 0.085 | 5.2 | 0.8 | Bal. |
| Example 13 | 1.44 | 0.083 | 5.3 | 0.6 | Bal. |
| Example 14 | 0.91 | 0.081 | 5.6 | 1.7 | Bal. |
| Example 15 | 1.20 | 0.098 | 4.3 | 1.2 | Bal. |
| Example 16 | 1.32 | 0.090 | 5.3 | 1.2 | Bal. |
| Example 17 | 1.47 | 0.082 | 5.6 | 1.0 | Bal. |
| Example 18 | 1.66 | 0.084 | 5.4 | 0.9 | Bal. |
| Example 19 | 1.88 | 0.066 | 7.0 | 0.8 | Bal. |
| Example 20 | 2.04 | 0.078 | 6.0 | 0.7 | Bal. |
| Example 21 | 2.10 | 0.074 | 5.8 | 0.7 | Bal. |
| Example 22 | 2.32 | 0.083 | 5.5 | 0.6 | Bal. |
| Example 23 | 1.98 | 0.079 | 5.6 | 0.7 | Bal. |
| Example 24 | 2.07 | 0.082 | 6.3 | 0.9 | Bal. |
| Example 25 | 3.61 | 0.084 | 6.9 | 0.6 | Bal. |

TABLE 2-1

| No. | C | Si | Mn | S | Cr | Ni |
|---|---|---|---|---|---|---|
| Com. Ex. 1 | 0.45 | 1.49 | 0.99 | 0.150 | 20.3 | 10.2 |
| Com. Ex. 2 | 0.30 | 1.42 | 1.05 | 0.130 | 20.1 | 9.9 |
| Com. Ex. 3 | 0.46 | 1.46 | 0.99 | 0.140 | 30.0 | 6.0 |
| Com. Ex. 4 | 0.46 | 1.52 | 0.99 | 0.150 | 20.1 | 9.8 |
| Com. Ex. 5 | 0.24 | 1.41 | 0.99 | 0.144 | 24.6 | 12.6 |
| Com. Ex. 6 | 0.72 | 1.38 | 1.01 | 0.152 | 24.7 | 12.9 |
| Com. Ex. 7 | 0.38 | 0.40 | 1.20 | 0.156 | 24.9 | 13.0 |
| Com. Ex. 8 | 0.39 | 4.50 | 0.98 | 0.163 | 24.5 | 13.1 |
| Com. Ex. 9 | 0.44 | 1.52 | 2.67 | 0.148 | 25.4 | 12.8 |
| Com. Ex. 10 | 0.43 | 1.44 | 0.95 | 0.670 | 25.0 | 12.9 |
| Com. Ex. 11 | 0.40 | 1.37 | 1.00 | 0.156 | 13.0 | 13.3 |
| Com. Ex. 12 | 0.41 | 1.39 | 1.21 | 0.145 | 32.0 | 13.1 |
| Com. Ex. 13 | 0.42 | 1.42 | 1.08 | 0.147 | 24.9 | 5.3 |
| Com. Ex. 14 | 0.41 | 1.41 | 0.97 | 0.151 | 25.0 | 33.7 |
| Com. Ex. 15 | 0.40 | 1.35 | 1.02 | 0.130 | 24.9 | 12.9 |
| Com. Ex. 16 | 0.44 | 1.49 | 0.98 | 0.145 | 25.2 | 12.6 |
| Com. Ex. 17 | 0.45 | 1.51 | 1.01 | 0.146 | 24.9 | 12.9 |
| Com. Ex. 18 | 0.42 | 1.43 | 0.97 | 0.153 | 24.8 | 12.8 |
| Com. Ex. 19 | 0.48 | 1.44 | 1.02 | 0.149 | 25.0 | 13.1 |
| Com. Ex. 20 | 0.42 | 1.48 | 0.95 | 0.135 | 24.6 | 13.0 |
| Com. Ex. 21 | 0.45 | 1.39 | 0.98 | 0.140 | 25.1 | 13.2 |
| Com. Ex. 22 | 0.42 | 1.38 | 1.00 | 0.143 | 24.8 | 12.9 |
| Com. Ex. 23 | 0.38 | 1.40 | 0.95 | 0.151 | 25.1 | 12.8 |
| Com. Ex. 24 | 0.48 | 1.44 | 0.96 | 0.138 | 25.4 | 13.6 |
| Com. Ex. 25 | 0.31 | 1.45 | 1.07 | 0.145 | 24.9 | 13.0 |
| Com. Ex. 26 | 0.44 | 1.43 | 1.14 | 0.144 | 25.2 | 13.1 |
| Com. Ex. 27 | 0.45 | 1.41 | 1.09 | 0.139 | 25.3 | 12.8 |
| Com. Ex. 28 | 0.56 | 1.42 | 0.99 | 0.150 | 24.7 | 12.5 |
| Com. Ex. 29 | 0.47 | 1.40 | 0.95 | 0.140 | 25.0 | 20.3 |
| Com. Ex. 30 | 0.45 | 1.42 | 0.97 | 0.142 | 24.5 | 19.8 |
| Com. Ex. 31 | 0.42 | 1.53 | 0.99 | 0.171 | 25.0 | 19.8 |
| Com. Ex. 32 | 0.46 | 1.47 | 0.97 | 0.159 | 24.5 | 20.4 |
| Com. Ex. 33 | 0.46 | 1.27 | 1.44 | 0.130 | 25.1 | 19.8 |

TABLE 2-2

| No. | Nb | N | C/N | A/B | Fe |
|---|---|---|---|---|---|
| Com. Ex. 1 | 0.01 | 0.070 | 6.4 | 82.8 | Bal. |
| Com. Ex. 2 | 0.18 | 0.074 | 4.1 | 3.4 | Bal. |
| Com. Ex. 3 | 0.88 | 0.085 | 5.4 | 0.5 | Bal. |
| Com. Ex. 4 | 2.04 | 0.257 | 1.8 | 0.3 | Bal. |
| Com. Ex. 5 | 0.98 | 0.077 | 3.1 | 0.7 | Bal. |
| Com. Ex. 6 | 1.01 | 0.083 | 8.7 | 1.2 | Bal. |
| Com. Ex. 7 | 1.03 | 0.080 | 4.8 | 0.9 | Bal. |
| Com. Ex. 8 | 1.05 | 0.074 | 5.3 | 0.9 | Bal. |
| Com. Ex. 9 | 0.97 | 0.086 | 5.1 | 1.0 | Bal. |
| Com. Ex. 10 | 1.06 | 0.079 | 5.4 | 0.9 | Bal. |
| Com. Ex. 11 | 1.12 | 0.085 | 4.7 | 0.8 | Bal. |
| Com. Ex. 12 | 1.04 | 0.084 | 4.9 | 0.9 | Bal. |
| Com. Ex. 13 | 0.99 | 0.078 | 5.4 | 0.3 | Bal. |
| Com. Ex. 14 | 0.98 | 0.083 | 4.9 | 2.7 | Bal. |
| Com. Ex. 15 | 0.00 | 0.152 | 2.6 | — | Bal. |
| Com. Ex. 16 | 0.04 | 0.081 | 5.4 | 26.1 | Bal. |
| Com. Ex. 17 | 0.57 | 0.086 | 5.2 | 1.8 | Bal. |
| Com. Ex. 18 | 0.51 | 0.084 | 5.0 | 1.9 | Bal. |
| Com. Ex. 19 | 1.71 | 0.087 | 5.5 | 0.5 | Bal. |
| Com. Ex. 20 | 1.86 | 0.089 | 4.7 | 0.4 | Bal. |
| Com. Ex. 21 | 2.16 | 0.166 | 2.7 | 0.4 | Bal. |
| Com. Ex. 22 | 5.81 | 0.082 | 5.1 | 0.1 | Bal. |
| Com. Ex. 23 | 0.97 | 0.001 | 380.0 | 0.9 | Bal. |
| Com. Ex. 24 | 1.03 | 0.649 | 0.7 | 1.0 | Bal. |
| Com. Ex. 25 | 1.01 | 0.096 | 3.2 | 0.8 | Bal. |
| Com. Ex. 26 | 0.97 | 0.132 | 3.3 | 1.0 | Bal. |
| Com. Ex. 27 | 0.98 | 0.058 | 7.8 | 1.0 | Bal. |
| Com. Ex. 28 | 1.00 | 0.071 | 7.9 | 1.0 | Bal. |
| Com. Ex. 29 | 0.49 | 0.183 | 2.6 | 3.4 | Bal. |
| Com. Ex. 30 | 0.03 | 0.077 | 5.8 | 55.1 | Bal. |
| Com. Ex. 31 | 2.41 | 0.092 | 4.6 | 0.5 | Bal. |
| Com. Ex. 32 | 2.73 | 0.085 | 5.4 | 0.5 | Bal. |
| Com. Ex. 33 | 0.83 | 0.192 | 2.4 | 1.9 | Bal. |

Using a 100-kg, high-frequency melting furnace with a basic lining, each starting material of Examples 1-25 and Comparative Examples 1-33 was melted in the air, charged into a ladle at 1550-1600° C., and immediately poured into a mold for casting a 1-inch Y-block at 1500-1550° C., to obtain each cast steel sample. A test piece was cut out of each sample and subjected to the following evaluations.

(1) Thermal Fatigue Properties

As thermal fatigue properties, the thermal fatigue life was measured by a thermal fatigue life test (TMF) and a high-temperature, low-cycle fatigue test (LCF).

(a) Thermal Fatigue Life Test (TMF)

A smooth-surfaced round rod test piece of 25 mm in gauge distance and 10 mm in diameter was cut out of each 1-inch Y-block sample, attached to an electro-hydraulic servo-type material tester (Servopulser EHF-ED10TF-20L available from Shimadzu Corporation) with a constraint ratio of 0.25, to measure its thermal fatigue life by subjecting each test piece to repeated heating/cooling cycles each comprising a temperature elevation time of 2 minutes, a temperature-keeping time of 1 minute, and a cooling time of 4 minutes, 7 minutes in total, with the lowest cooling temperature of 150° C., the highest heating temperature of 1000° C., and a temperature amplitude of 850° C., in the air, thereby causing thermal fatigue failure while mechanically constraining elongation and shrinkage due to heating and cooling.

The degree of mechanical constraint is expressed by a constraint ratio defined by [(elongation by free thermal expansion−elongation under mechanical constraint)/elongation by free thermal expansion]. For example, a constraint ratio of 1.0 means a mechanical constraint condition, in which no elongation is permitted when a test piece is heated from 150° C. to 1000° C. For example, when elongation by free expansion is 2 mm, a constraint ratio of 0.5 means a mechanical constraint condition, in which only elongation of 1 mm is permitted. Accordingly, the constraint ratio of 0.5 applies a compression load during temperature elevation, and a tensile load during temperature decrease. Because the constraint ratios of actual exhaust members for automobiles are about 0.1-0.5 permitting elongation to some extent, the thermal fatigue life was evaluated at a constraint ratio of 0.25.

The thermal fatigue life was defined as the number of heating/cooling cycles until the maximum tensile load measured in each cycle decreased to 75%, in a load-temperature diagram determined by load change by the repetition of heating and cooling, with the maximum tensile load (generated at the lowest temperature) in the second cycle as a reference (100%). The measurement results of thermal fatigue life by TMF in Examples 1-25 and Comparative Examples 1-33 are shown in Tables 3 and 4, respectively.

To have sufficient heat resistance at about 1000° C., the thermal fatigue life measured by TMF of heating and cooling at a constraint ratio of 0.25, which is hereinafter referred to as TMF thermal fatigue life, with the highest heating temperature of 1000° C. and the temperature amplitude of 850° C., is preferably 900 cycles or more. Exhaust members made of a heat-resistant cast steel having a TMF thermal fatigue life of 900 cycles or more have long lives until thermal fatigue failure occurs by cracking and deformation due to the repeated heating and cooling of engines.

As is clear from Tables 3 and 4, all of Examples 1-25 exhibited TMF thermal fatigue lives of 900 cycles or more. Thus, when the heat-resistant, austenitic cast steel of the present invention having excellent thermal fatigue properties is used for exhaust members repeatedly subjected to heating to a temperature of about 1000° C. and cooling, the exhaust members are expected to exhibit sufficient heat resistance and durability. On the other hand, any of the cast steels of Comparative Examples 1-33 exhibited a TMF thermal fatigue life of less than 900 cycles, except for Comparative Example 2. Incidentally, Comparative Example 2 exhibited a short thermal fatigue life by LCF.

(b) High-temperature, low-cycle fatigue test (LCF)

The high-temperature, low-cycle fatigue test (LCF) was conducted as follows according to "Standard for High-Temperature, Low-Cycle Fatigue Testing (JSMS-SD-7-03)" issued by The Society of Materials Science, Japan on Jun. 2, 2003. A smooth-surfaced, flanged, round rod test piece of 25 mm in gauge distance and 10 mm in diameter was cut out of each 1-inch Y-block sample, attached to the same electro-hydraulic servo material tester as in TMF. Each test piece was repeatedly subjected to strain loaded by tension and compression at a constant temperature of 900° C. in the air, each cycle comprising loading tensile strain of 0.25% for 5 seconds, loading compression strain of 0.25% for 5 seconds, and keeping compression strain of 0.25% for 60 seconds, 70 seconds in total, under the conditions of a strain amplitude of 0.5% and a strain rate of 0.1%/second. The strain amplitude was set at 0.5%, because strain of about 0.5% is presumably generated in portions of actual automobile exhaust members, in which cracking likely occurs. The strain rate was set at 0.1%/second, because it is recommended in "Standard for High-Temperature, Low-Cycle Fatigue Testing (JSMS-SD-7-03)."

The thermal fatigue life was determined by load (stress) decrease by the repetition of tension and compression, as the number of tension/compression cycles until tension load decreased to 75% of the maximum tensile load determined by the extrapolation of the tension load change before cracking occurred. The LCF thermal fatigue life measurement results in Examples 1-25 and Comparative Examples 1-33 are shown in Tables 3 and 4, respectively.

To have sufficient heat resistance at about 1000° C., the LCF thermal fatigue life measured by applying tensile strain and compression strain under the conditions of a test temperature of 900° C., a strain amplitude of 0.5%, a strain rate of 0.1%/second, and a compression-keeping time of 1 minute is preferably 1500 cycles or more. Exhaust members made of the heat-resistant cast steel having an LCF thermal fatigue life of 1500 cycles or more have long lives until thermal fatigue failure occurs by cracking and deformation due to the repeated heating and cooling of engines.

As is clear from Table 3, the LCF thermal fatigue life was 1500 cycles or more in all of Examples 1-25. Among them, in Examples 9-13, 15-21 and 23, in which the Cr content was 24-26%, the Ni content was 11-22%, and AB was 0.7-1.3, the LCF thermal fatigue life was 1800 cycles or more.

The above results revealed that the heat-resistant, austenitic cast steels of the present invention have excellent thermal fatigue properties, and that exhaust members made thereof are expected to exhibit sufficient heat resistance and durability when repeatedly subjected to heating to temperatures of about 1000° C. and cooling. On the other hand, as is clear from Table 4, any of the cast steels of Comparative Examples 1-33 had an LCF thermal fatigue life of less than 1500 cycles.

(2) Weight Reduction by Oxidation

An oxide film is formed on a surface of an exhaust member exposed to an exhaust gas (containing oxidizing gases such as sulfur oxide, nitrogen oxide, etc.) at 950-1100° C., which is discharged from an engine. As the oxidation proceeds, cracking occurs from the oxide film and propagates inside the exhaust member, and finally penetrates from the outer surface of the exhaust member to the inner surface, resulting in the leakage of an exhaust gas and the breakage of the exhaust member. To evaluate the oxidation resistance of an exhaust member at 1050° C., weight reduction by oxidation was measured by the following method. Namely, a round rod test piece of 10 mm in diameter and 20 mm in length was cut out of each 1-inch Y-block sample, kept at 1050° C. for 200 hours in the air, and subjected to shot blasting to remove oxide scale, thereby determining mass change per a unit area before and after the oxidation test [weight reduction by oxidation ($mg/cm^2$)]. The weight reductions by oxidation in Examples 1-25 and Comparative Examples 1-33 are shown in Tables 3 and 4, respectively.

To exhibit sufficient heat resistance at about 1000° C., the weight reduction by oxidation is preferably 30 $mg/cm^2$ or less, more preferably 20 $mg/cm^2$ or less, most preferably 10 $mg/cm^2$ or less. As is clear from Table 3, all of Examples 1-25 exhibited the weight reduction by oxidation of less than 30 $mg/cm^2$, indicating that the heat-resistant, austenitic cast steel of the present invention has excellent oxidation resistance, exhibiting sufficient oxidation resistance when used for exhaust members reaching temperatures of about 1000° C. As is clear from Table 4, in any of Comparative Examples 7, 11 and 13 in which the amount of Si, Cr or Ni was too small, and Comparative Examples 9 and 22 in which the amount of Mn or Nb was too large, the weight reduction by oxidation exceeded 30 mg/cm². This means that the cast steels of Comparative Examples 7, 9, 11, 13 and 22 cannot exhibit sufficient oxidation resistance when used for exhaust members reaching temperatures of about 1000° C.

(3) High-Temperature Yield Strength

Exhaust members are required to be resistant to thermal deformation, even in the repeated start (heating) and stop (cooling) of engines. To secure sufficient thermal deformation resistance, it preferably has high high-temperature strength. The high-temperature strength is evaluated by 0.2-% yield strength at 1050° C. (high-temperature yield strength). A smooth-surfaced, flanged, round rod test piece of 50 mm in gauge distance and 10 mm in diameter was cut out of each 1-inch Y-block sample, and attached to the same electro-hydraulic servo-type material tester as in TMF, to measure the 0.2-% yield strength (MPa) of each test piece at 1050° C. in the air. The high-temperature yield strengths in Examples 1-25 and Comparative Examples 1-33 are shown in Tables 3 and 4, respectively.

To exhibit sufficient heat resistance at about 1000° C., the 0.2-% yield strength at 1050° C. is preferably 20 MPa or more. Exhaust members made of the heat-resistant cast steel having 0.2-% yield strength of 20 MPa or more at 1050° C. have sufficient strength to suppress cracking and breakage at 950-1100° C. under constraint. The heat-resistant, austenitic cast steel of the present invention more preferably has 0.2-% yield strength of 30 MPa or more at 1050° C.

As is clear from Table 3, the test pieces of Examples 1-25 had high-temperature yield strength of 20 MPa or more, indicating that the heat-resistant, austenitic cast steels of the present invention have excellent high-temperature yield strength, exhibiting sufficient high-temperature strength when used for exhaust members reaching temperatures of about 1000° C. On the other hand, as is clear from Table 4, in any of Comparative Example 23 having a too small N content, and Comparative Examples 6, 8, 10, 12, 22 and 24 in which the amount of C, Si, S, Cr or N was too large, the high-temperature yield strength was less than 20 MPa, indicating that the cast steels of Comparative Examples 6, 8, 10, 12 and 22-24 had insufficient high-temperature yield strength, failing to exhibit sufficient high-temperature strength when used for exhaust members reaching temperatures of about 1000° C.

(4) Room-Temperature Elongation

Exhaust members are required to be resistant to thermal deformation in the repeated start (heating) and stop (cooling) of engines. To secure sufficient thermal deformation resistance, they preferably have high ductility in addition to high high-temperature yield strength. To evaluate ductility, a smooth-surfaced, flanged, round rod test piece of 50 mm in gauge distance and 10 mm in diameter was cut out of each 1-inch Y-block sample, attached to the same electro-hydraulic servo material tester as in TMF, to measure the room-temperature elongation (%) of each test piece at 25° C. in the air. The room-temperature elongations in Examples 1-25 and Comparative Examples 1-33 are shown in Tables 3 and 4, respectively.

The heat-resistant, austenitic cast steel of the present invention preferably has elongation of 2.0% or more at room temperature. When exhaust members made of the heat-resistant cast steel having room-temperature elongation of 2.0% or more are cooled from high temperatures to near room temperature, they exhibit sufficient ductility to suppress deformation and cracking, which is caused by the conversion of compression stress generated at high temperatures to tensile stress. Also, the exhaust members can be withstand mechanical vibration and shock applied during production and assembling to engines, at the time of starting automobiles, during driving automobiles, etc., resulting in suppressed cracking and breakage. The room-temperature elongation of the heat-resistant, austenitic cast steel of the present invention is more preferably 3.0% or more, most preferably 4.0% or more.

As is clear from Table 3, the room-temperature elongation was 2.0% or more in all of Examples 1-25. This indicates that the heat-resistant, austenitic cast steels of the present invention have excellent room-temperature elongation, exhibiting sufficient thermal deformation resistance when used for exhaust members repeatedly subjected to heating and cooling. On the other hand, as is clear from Table 4, the room-temperature elongation was less than 2.0% in Comparative Examples 10, 12, 22 and 24 excessively containing S, Cr, Nb or N. This indicates that the cast steels of Comparative Examples 10, 12, 22 and 24 have insufficient room-temperature elongation, failing to exhibit sufficient thermal deformation resistance when used for exhaust members repeatedly subjected to heating and cooling.

It was found from above that the heat-resistant, austenitic cast steels of the present invention have excellent thermal fatigue properties necessary for exhibiting heat resistance and durability required for exhaust members reaching temperatures of about 1000° C., as well as oxidation resistance, high-temperature strength and thermal deformation resistance.

TABLE 3

| | Properties | | | | |
|---|---|---|---|---|---|
| No. | TMF (Cycles) | LCF (Cycles) | Weight Reduction by Oxidation (mg/cm²) | High-Temperature Yield Strength (MPa) | Room-Temperature Elongation (%) |
| Example 1 | 907 | 1520 | 29 | 72 | 2 |
| Example 2 | 1046 | 1740 | 28 | 68 | 3 |
| Example 3 | 1035 | 1770 | 25 | 55 | 4 |
| Example 4 | 924 | 1540 | 27 | 37 | 5 |
| Example 5 | 944 | 1600 | 24 | 32 | 5 |
| Example 6 | 1097 | 1790 | 18 | 32 | 10 |
| Example 7 | 1058 | 1680 | 19 | 31 | 10 |
| Example 8 | 1053 | 1780 | 19 | 30 | 9 |
| Example 9 | 1031 | 1920 | 20 | 28 | 8 |

TABLE 3-continued

| | Properties | | | | |
|---|---|---|---|---|---|
| No. | TMF (Cycles) | LCF (Cycles) | Weight Reduction by Oxidation (mg/cm$^2$) | High-Temperature Yield Strength (MPa) | Room-Temperature Elongation (%) |
| Example 10 | 1206 | 1970 | 21 | 26 | 9 |
| Example 11 | 1578 | 2010 | 22 | 25 | 8 |
| Example 12 | 1373 | 1960 | 23 | 25 | 5 |
| Example 13 | 1021 | 1840 | 23 | 23 | 6 |
| Example 14 | 1121 | 1550 | 12 | 28 | 9 |
| Example 15 | 1012 | 1890 | 14 | 27 | 7 |
| Example 16 | 1060 | 1910 | 15 | 27 | 7 |
| Example 17 | 1098 | 1950 | 15 | 26 | 7 |
| Example 18 | 1002 | 1930 | 18 | 25 | 6 |
| Example 19 | 1260 | 1910 | 19 | 24 | 5 |
| Example 20 | 1178 | 1900 | 20 | 23 | 4 |
| Example 21 | 1067 | 1840 | 20 | 23 | 4 |
| Example 22 | 1079 | 1640 | 22 | 22 | 3 |
| Example 23 | 1149 | 1810 | 18 | 23 | 4 |
| Example 24 | 909 | 1540 | 19 | 24 | 3 |
| Example 25 | 958 | 1520 | 28 | 21 | 2 |

TABLE 4

| | Properties | | | | |
|---|---|---|---|---|---|
| No. | TMF (Cycles) | LCF (Cycles) | Weight Reduction by Oxidation (mg/cm$^2$) | High-Temperature Yield Strength (MPa) | Room-Temperature Elongation (%) |
| Com. Ex. 1 | 810 | 1350 | 26 | 33 | 12 |
| Com. Ex. 2 | 906 | 1230 | 27 | 26 | 10 |
| Com. Ex. 3 | 713 | 1230 | 25 | 21 | 4 |
| Com. Ex. 4 | 681 | 850 | 24 | 22 | 8 |
| Com. Ex. 5 | 505 | 1090 | 22 | 22 | 7 |
| Com. Ex. 6 | 432 | 860 | 23 | 12 | 8 |
| Com. Ex. 7 | 621 | 1380 | 45 | 23 | 7 |
| Com. Ex. 8 | 829 | 1480 | 21 | 8 | 4 |
| Com. Ex. 9 | 860 | 1380 | 97 | 27 | 5 |
| Com. Ex. 10 | 710 | 1440 | 23 | 15 | 1 |
| Com. Ex. 11 | 365 | 810 | 84 | 46 | 4 |
| Com. Ex. 12 | 644 | 1430 | 18 | 14 | 1 |
| Com. Ex. 13 | 512 | 930 | 55 | 20 | 4 |
| Com. Ex. 14 | 898 | 1430 | 20 | 26 | 3 |
| Com. Ex. 15 | 566 | 960 | 17 | 32 | 12 |
| Com. Ex. 16 | 860 | 1310 | 17 | 30 | 11 |
| Com. Ex. 17 | 835 | 1390 | 18 | 28 | 10 |
| Com. Ex. 18 | 631 | 1440 | 18 | 29 | 11 |
| Com. Ex. 19 | 738 | 1420 | 20 | 22 | 6 |
| Com. Ex. 20 | 704 | 1340 | 22 | 23 | 6 |
| Com. Ex. 21 | 647 | 1070 | 25 | 22 | 5 |
| Com. Ex. 22 | 436 | 870 | 43 | 11 | 1 |
| Com. Ex. 23 | 636 | 940 | 19 | 18 | 7 |
| Com. Ex. 24 | 540 | 1080 | 19 | 15 | 1 |
| Com. Ex. 25 | 602 | 1190 | 19 | 24 | 8 |
| Com. Ex. 26 | 828 | 1450 | 18 | 25 | 7 |
| Com. Ex. 27 | 872 | 1340 | 18 | 25 | 7 |
| Com. Ex. 28 | 692 | 1000 | 19 | 24 | 7 |
| Com. Ex. 29 | 609 | 1010 | 11 | 27 | 9 |
| Com. Ex. 30 | 721 | 1030 | 10 | 33 | 9 |
| Com. Ex. 31 | 625 | 1250 | 24 | 22 | 2 |
| Com, Ex. 32 | 883 | 1280 | 26 | 20 | 2 |
| Com. Ex. 33 | 734 | 1230 | 9 | 47 | 5 |

Examples 26-49, and Comparative Example 34

The chemical compositions, C/N and A/B of the heat-resistant, austenitic cast steels of Examples 26-49, and the heat-resistant cast steel of Comparative Example 34 are shown in Tables 5-1 and 5-2. Inevitable impurities in each heat-resistant cast steel were 0.02% or less of P, 0.03% or less of Al, 0.1% or less of W, and 0.1% or less of Mo.

TABLE 5-1

| No. | Composition (% by mass) | | | | | |
|---|---|---|---|---|---|---|
| | C | Si | Mn | S | Cr | Ni |
| Example 26 | 0.45 | 1.39 | 0.97 | 0.142 | 19.8 | 8.3 |
| Example 27 | 0.46 | 1.44 | 1.01 | 0.149 | 19.9 | 9.8 |
| Example 28 | 0.42 | 1.40 | 0.98 | 0.141 | 24.9 | 13.2 |
| Example 29 | 0.40 | 1.42 | 0.99 | 0.138 | 25.0 | 12.7 |
| Example 30 | 0.41 | 1.45 | 0.95 | 0.154 | 25.1 | 12.9 |
| Example 31 | 0.41 | 1.42 | 1.01 | 0.150 | 25.2 | 12.8 |
| Example 32 | 0.44 | 1.51 | 1.00 | 0.138 | 24.8 | 13.6 |
| Example 33 | 0.46 | 1.48 | 0.98 | 0.147 | 24.9 | 13.1 |
| Example 34 | 0.45 | 1.49 | 0.95 | 0.148 | 25.1 | 12.9 |
| Example 35 | 0.46 | 1.45 | 1.02 | 0.151 | 25.0 | 13.1 |
| Example 36 | 0.45 | 1.33 | 1.10 | 0.145 | 25.0 | 13.4 |
| Example 37 | 0.44 | 1.37 | 1.13 | 0.143 | 25.2 | 12.9 |
| Example 38 | 0.43 | 1.42 | 1.08 | 0.152 | 25.1 | 13.0 |
| Example 39 | 0.47 | 1.40 | 0.97 | 0.156 | 24.8 | 13.0 |
| Example 40 | 0.44 | 1.48 | 0.98 | 0.140 | 25.0 | 19.8 |
| Example 41 | 0.45 | 1.45 | 1.01 | 0.138 | 25.3 | 20.2 |
| Example 42 | 0.46 | 1.42 | 1.00 | 0.145 | 24.8 | 20.0 |
| Example 43 | 0.41 | 1.39 | 0.98 | 0.152 | 25.0 | 19.8 |
| Example 44 | 0.45 | 1.40 | 1.07 | 0.150 | 25.2 | 19.5 |
| Example 45 | 0.43 | 1.42 | 1.12 | 0.151 | 25.2 | 20.3 |
| Example 46 | 0.46 | 1.41 | 1.02 | 0.147 | 25.0 | 20.4 |
| Example 47 | 0.45 | 1.44 | 1.00 | 0.143 | 24.9 | 18.7 |
| Example 48 | 0.44 | 0.81 | 1.01 | 0.141 | 24.8 | 19.9 |
| Example 49 | 0.45 | 0.55 | 0.98 | 0.139 | 24.6 | 19.7 |
| Com. Ex. 34 | 0.32 | 1.98 | 1.54 | 0.106 | 20.1 | 8.9 |

TABLE 5-2

| No. | Composition (% by mass) | | | | | |
|---|---|---|---|---|---|---|
| | Nb | N | Zr | C/N | A/B | Fe |
| Example 26 | 0.62 | 0.079 | 0.053 | 5.7 | 0.9 | Bal. |
| Example 27 | 1.01 | 0.080 | 0.049 | 5.8 | 0.7 | Bal. |
| Example 28 | 0.60 | 0.079 | 0.005 | 5.3 | 1.7 | Bal. |
| Example 29 | 0.72 | 0.076 | 0.024 | 5.3 | 1.3 | Bal. |
| Example 30 | 0.65 | 0.081 | 0.017 | 5.1 | 1.5 | Bal. |
| Example 31 | 0.60 | 0.082 | 0.006 | 5.0 | 1.6 | Bal. |
| Example 32 | 0.73 | 0.069 | 0.043 | 6.4 | 1.4 | Bal. |
| Example 33 | 0.80 | 0.078 | 0.055 | 5.9 | 1.3 | Bal. |
| Example 34 | 0.86 | 0.080 | 0.017 | 5.6 | 1.1 | Bal. |
| Example 35 | 1.00 | 0.085 | 0.048 | 5.4 | 1.0 | Bal. |
| Example 36 | 1.14 | 0.077 | 0.198 | 5.8 | 0.9 | Bal. |
| Example 37 | 1.24 | 0.074 | 0.342 | 5.9 | 0.7 | Bal. |
| Example 38 | 1.42 | 0.078 | 0.063 | 5.5 | 0.6 | Bal. |
| Example 39 | 0.97 | 0.082 | 0.494 | 5.7 | 1.0 | Bal. |
| Example 40 | 0.93 | 0.081 | 0.047 | 5.4 | 1.6 | Bal. |
| Example 41 | 1.15 | 0.075 | 0.056 | 6.0 | 1.3 | Bal. |
| Example 42 | 1.27 | 0.083 | 0.043 | 5.5 | 1.2 | Bal. |
| Example 43 | 1.38 | 0.081 | 0.051 | 5.1 | 1.0 | Bal. |
| Example 44 | 1.51 | 0.078 | 0.054 | 5.8 | 1.0 | Bal. |
| Example 45 | 1.79 | 0.086 | 0.053 | 5.0 | 0.8 | Bal. |
| Example 46 | 2.04 | 0.088 | 0.087 | 5.2 | 0.7 | Bal. |
| Example 47 | 2.15 | 0.085 | 0.084 | 5.3 | 0.6 | Bal. |
| Example 48 | 1.78 | 0.082 | 0.052 | 5.4 | 0.8 | Bal. |
| Example 49 | 1.76 | 0.077 | 0.045 | 5.8 | 0.8 | Bal. |
| Com. Ex. 34 | 0.48 | 0.192 | 0.042 | 1.7 | 1.1 | Bal. |

Each heat-resistant cast steel of Examples 26-49 and Comparative Example 34 was produced by the same method as in Examples 1-25, to measure thermal fatigue properties, weight reduction by oxidation, high-temperature yield strength, room-temperature elongation, and the number of Zr nitride particles. The measurement results are shown in Table 6.

TABLE 6

| No. | Properties | | | | | |
|---|---|---|---|---|---|---|
| | Thermal Fatigue Life (Cycles) | | Weight Reduction by Oxidation | High-Temperature Yield Strength | Room-Temperature Elongation | Number of Zr Nitride |
| | TMF | LCF | (mg/cm$^2$) | (MPa) | (%) | Particles |
| Example 26 | 1204 | 2150 | 7 | 38 | 4 | 39 |
| Example 27 | 1233 | 2090 | 8 | 37 | 5 | 47 |
| Example 28 | 1120 | 2000 | 7 | 39 | 8 | 24 |
| Example 29 | 1424 | 2190 | 7 | 39 | 8 | 40 |
| Example 30 | 1271 | 2050 | 7 | 38 | 8 | 36 |
| Example 31 | 1307 | 2080 | 7 | 40 | 8 | 35 |
| Example 32 | 1344 | 2100 | 7 | 38 | 8 | 48 |
| Example 33 | 1450 | 2230 | 8 | 35 | 7 | 46 |
| Example 34 | 1501 | 2240 | 8 | 35 | 7 | 43 |
| Example 35 | 1578 | 2320 | 9 | 34 | 7 | 44 |
| Example 36 | 1528 | 2280 | 9 | 34 | 6 | 75 |
| Example 37 | 1514 | 2210 | 9 | 33 | 6 | 95 |
| Example 38 | 1419 | 2150 | 11 | 32 | 5 | 50 |
| Example 39 | 1358 | 2080 | 7 | 34 | 8 | 147 |
| Example 40 | 1303 | 2030 | 5 | 43 | 9 | 42 |
| Example 41 | 1439 | 2180 | 6 | 43 | 8 | 45 |
| Example 42 | 1485 | 2200 | 6 | 43 | 8 | 48 |
| Example 43 | 1467 | 2240 | 7 | 41 | 7 | 51 |
| Example 44 | 1453 | 2260 | 8 | 40 | 7 | 49 |
| Example 45 | 1487 | 2220 | 8 | 38 | 6 | 43 |
| Example 46 | 1408 | 2200 | 9 | 36 | 5 | 60 |
| Example 47 | 1373 | 2100 | 9 | 36 | 5 | 53 |
| Example 48 | 1424 | 2180 | 14 | 34 | 7 | 51 |
| Example 49 | 1397 | 2140 | 25 | 32 | 6 | 46 |
| Com. Ex. 34 | 748 | 1140 | 35 | 35 | 5 | 37 |

(1) Thermal Fatigue Properties

As is clear from Table 6, all of Examples 26-49 exhibited TMF thermal fatigue lives of 1000 cycles or more, and LCF thermal fatigue lives of 2000 cycles or more. These results revealed that the heat-resistant, austenitic cast steels of the present invention have excellent thermal fatigue properties, and that when they are used for exhaust members repeatedly subjected to heating to temperatures of about 1000° C. and cooling, the exhaust members are expected to exhibit sufficient heat resistance and durability. On the other hand, the cast steel of Comparative Example 34 having too small a Nb content and a low C/N ratio exhibited a TMF thermal fatigue life of less than 900 cycles, and an LCF thermal fatigue life of less than 1500 cycles.

(2) Weight Reduction by Oxidation

As is clear from Table 6, the weight reduction by oxidation was less than 30 mg/cm$^2$ in all of Examples 26-49, indicating that the heat-resistant, austenitic cast steels of the present invention have excellent oxidation resistance, exhibiting sufficient oxidation resistance when used for exhaust members reaching temperatures of about 1000° C. On the other hand, the cast steel of Comparative Example 34 having a too small Nb content with small C/N exhibited weight reduction by oxidation exceeding 30 mg/cm$^2$. This indicates that the cast steel of Comparative Example 34 cannot exhibit sufficient oxidation resistance when used for exhaust members reaching temperatures of about 1000° C.

(3) High-Temperature Yield Strength

As is clear from Table 6, the high-temperature yield strength was 20 MPa or more in Examples 26-49. This indicates that the heat-resistant, austenitic cast steels of the present invention have excellent high-temperature yield strength, exhibiting sufficient high-temperature strength when used for exhaust members reaching temperatures of about 1000° C.

(4) Room-Temperature Elongation

As is clear from Table 6, the room-temperature elongation was 2.0% or more in all of Examples 26-49. This indicates that the heat-resistant, austenitic cast steels of the present invention have excellent room-temperature elongation, exhibiting sufficient thermal deformation resistance when used for exhaust members repeatedly subjected to heating and cooling.

As described above, The heat-resistant, austenitic cast steels of the present invention containing Zr also have not only excellent thermal fatigue properties necessary for exhibiting heat resistance and durability required for exhaust members reaching temperatures of about 1000° C., but also oxidation resistance, high-temperature strength and thermal deformation resistance.

(5) Number of Zr Nitride Particles

A structure-observing test piece cut out of a bottom portion of the 1-inch Y-block sample of Example 35 was mirror-polished, and its electron photomicrograph was taken in a field of 158 μm×119 μm by a field-emission scanning electron microscope (FE-SEM, SU-70 available from Hitachi High-Technologies Corporation) without erosion. FIG. 1 shows the electron photomicrograph, in which a light gray portion is an austenite phase 1, white particles are granular Nb carbide 2, angular grayish white particles are Zr nitride 3, dark gray particles are Cr carbide 4, and black particles are sulfide particles 5 such as MnS, etc. The Zr nitride particles were confirmed by analysis by an energy-dispersive X-ray spectrometer (EDS, EDAX Genesis available from AMETEK Co., Ltd.) attached to FE-SEM.

A structure-observation test piece was cut out of each sample, and its electron photomicrographs were taken in three arbitrary fields of 500 μm×500 μm (0.25 mm$^2$). The number of Zr nitride particles having equivalent circle diameters of 1.5 μm or more were counted in each field by image analysis, and averaged for three fields. The results in Examples 26-49 and Comparative Example 34 are shown in Table 6. As is clear from Table 6, in the structure of each heat-resistant cast steel of Examples 26-49 containing Zr, the number of Zr nitride particles having equivalent circle diameters of 1.5 μm or more was 20-150 per a field area of 0.25 mm$^2$.

What is claimed is:

1. A heat-resistant, austenitic cast steel having excellent thermal fatigue properties, consisting of by mass
   0.3-0.6% of C,
   0.5-3% of Si,
   0.5-2% of Mn,
   15-30% of Cr,
   6-30% of Ni,
   0.6-5% of Nb,
   0.01-0.5% of N, and
   0.05-0.5% of S,
   an amount ratio C/N of C to N being 4-7,
   the balance being Fe and inevitable impurities, and
   a ratio AB of a Cr-carbide-forming index A to a Nb-carbide-forming index B expressed
   by the following formulae (1) and (2):

$$A=8.5C-Nb+0.05Cr+0.65Ni-5 \quad (1), \text{and}$$

$$B=7.8Nb \quad (2),$$

wherein the symbol of an element in each formula represents its content (% by mass), being 0.6-1.7.

2. A heat-resistant, austenitic cast steel having excellent thermal fatigue properties, consisting of by mass
   0.3-0.6% of C,
   0.5-3% of Si,
   0.5-2% of Mn,
   15-30% of Cr,
   6-30% of Ni,
   0.6-5% of Nb,
   0.005-0.5% of Zr,
   0.01-0.5% of N, and
   0.05-0.5% of S,
   an amount ratio C/N of C to N being 4-7,
   the balance being Fe and inevitable impurities, and
   a ratio AB of a Cr-carbide-forming index A to a Nb-carbide-forming index B expressed by the following formulae (1) and (2):

$$A=8.5C-Nb+0.05Cr+0.65Ni-5 \quad (1), \text{and}$$

$$B=7.8Nb \quad (2),$$

wherein the symbol of an element in each formula represents its content (% by mass), being 0.6-1.7.

3. The heat-resistant, austenitic cast steel according to claim 2, wherein the number of Zr nitride particles having equivalent circle diameters of 1.5 μm or more in the structure is 20-150 per a field area of 0.25 mm$^2$.

4. The heat-resistant, austenitic cast steel according to claim 1, wherein its fatigue life is 1500 cycles or more, when measured by a high-temperature, low-cycle fatigue test, which adds and removes tensile strain and compression strain under the conditions of a test temperature of 900° C., a strain amplitude of 0.5%, a strain-applying speed of 0.1%/second, and compression-keeping time 1 minute.

5. An exhaust member made of the heat-resistant, austenitic cast steel recited in claim 1.

6. The exhaust member according to claim 5, which is a turbine housing, an exhaust manifold, a turbine-housing-integrated exhaust manifold, a catalyst case, a catalyst-case-integrated exhaust manifold, or an exhaust outlet.

7. The heat-resistant, austenitic cast steel according to claim 1, wherein S content is 0.1-0.5% by mass.

8. The heat-resistant, austenitic cast steel according to claim 1, wherein an amount ratio C/N of C to N is 5-7.

9. The heat-resistant, austenitic cast steel according to claim 2, wherein its fatigue life is 1500 cycles or more, when measured by a high-temperature, low-cycle fatigue test, which adds and removes tensile strain and compression strain under the conditions of a test temperature of 900° C., a strain amplitude of 0.5%, a strain-applying speed of 0.1%/second, and compression-keeping time 1 minute.

10. An exhaust member made of the heat-resistant, austenitic cast steel recited in claim 2.

11. The exhaust member according to claim 10, which is a turbine housing, an exhaust manifold, a turbine-housing-integrated exhaust manifold, a catalyst case, a catalyst-case-integrated exhaust manifold, or an exhaust outlet.

12. The heat-resistant, austenitic cast steel according to claim 2, wherein S content is 0.1-0.5% by mass.

13. The heat-resistant, austenitic cast steel according to claim 2, wherein an amount ratio C/N of C to N is 5-7.

\* \* \* \* \*